United States Patent [19]

Stephenson

[11] Patent Number: 4,515,030

[45] Date of Patent: May 7, 1985

[54] EXTENDED RANGE VARIATOR FOR FUEL PUMP COMPUTER

[75] Inventor: Tom Stephenson, Simsbury, Conn.

[73] Assignee: Petroleum Meter & Pump Co., Inc., Avon, Conn.

[21] Appl. No.: 453,332

[22] Filed: Dec. 30, 1982

[51] Int. Cl.[3] .............................................. F16H 3/22

[52] U.S. Cl. ....................................... 74/348; 74/349; 74/681; 235/61 L

[58] Field of Search ................. 74/348, 349, 341, 681; 235/61 L, 61 M, 61 FB, 61 FC

[56] References Cited

U.S. PATENT DOCUMENTS

| | | | |
|---|---|---|---|
| 1,397,172 | 11/1921 | Miot | 74/384 |
| 2,219,024 | 10/1940 | Spaunburg et al. | 74/681 |
| 2,804,784 | 9/1957 | Blumentritt | 74/681 |
| 3,875,816 | 4/1975 | Wells | 74/348 |
| 4,136,573 | 1/1979 | Smilgys et al. | 74/348 |
| 4,255,952 | 3/1981 | Johnson | 74/421 R X |
| 4,283,967 | 8/1981 | Smilgys | 74/681 |
| 4,292,506 | 9/1981 | Devanney | 235/61 L |
| 4,375,030 | 2/1983 | Devanney | 235/61 L |

FOREIGN PATENT DOCUMENTS

| | | | |
|---|---|---|---|
| 209013 | 4/1909 | Fed. Rep. of Germany | 74/348 |
| 562109 | 10/1932 | Fed. Rep. of Germany | 74/681 |
| 2232375 | 1/1974 | Fed. Rep. of Germany . | |
| 2460430 | 6/1976 | Fed. Rep. of Germany . | |
| 1774147 | 1/1977 | Fed. Rep. of Germany . | |
| 1033026 | 7/1953 | France . | |

*Primary Examiner*—Allan D. Herrmann
*Assistant Examiner*—Arthur T. Quiray

[57] ABSTRACT

A pricing mechanism for a mechanical computer, used in connection with a fuel dispensing pump, is of expanded capacity, enabling a price of $0.000 to $4.999 to be set and posted. The mechanism for expanding the variator comprises a supplemental range assembly, which cooperates with a secondary cone gear and a secondary summing mechanism disposed on the shaft of one of the range arm assemblies; the selector gear of the supplemental assembly can be selectively positioned to post a dollar value through four dollars. Means for reducing the speed of the output gears of the range arm assemblies, and for minimizing the size of the secondary integrator, are also provided.

22 Claims, 15 Drawing Figures

EXTENDED RANGE VARIATOR FOR FUEL PUMP COMPUTER

BACKGROUND OF THE INVENTION

Traditionally, variators for the mechanical computers that are used in fuel pumps have had the capacity for setting and posting unit prices in three digits, or places (i.e., 00.0¢ to 99.9¢). With the advent in the United States of gasoline prices in excess of one dollar, and with similar occurrences and monetary changes elsewhere throughout the world, the demand has been created for variators of expanded capacity. Needless to say, the most pressing need has been for means by which existing pricing mechanisms can be retrofit to expand their capability from three to four places in the posted unit volume price.

The prior art has recognized and addressed this demand. For example, in U.S. Pat. No. 3,875,816, Wells suggests the use of a secondary gear stack to extend the range of a variator, utilizing the existing highest place range arm for selective engagement with the gears of either the primary or the secondary stack.

Smilgys et al disclose, in U.S. Pat. No. 4,136,573, the conversion of a fuel pump variator from a three-place to a four-place unit volume price, by adding an auxillary take-off assembly and an additional summation differential mounted coaxially above the cone gear. A selector or idler gear arrangement enables either a "0", a "1", or a "2" to be posted in the highest place position.

Devanney U.S. Pat. No. 4,292,506 teaches means for converting a fuel pump computer by employing a selective adder mechanism installed in the mechanical register, for manually adding either 50 cents or one dollar to a base unit volume price. German Offenlegungsschrift No. 2 232 375 is similar, in disclosing a fourth place mechanism that is integrated into the counter section of the computer.

A variator for four-place pricing is disclosed in German Offenlegungsschrift No. 24 60 430, which utilizes three summing mechanisms. One of the summing mechanisms receives the inputs from the two lower position units, the second receives the inputs from the two higher position units, and the third sums the inputs from the other two. The fourth place assembly, which is utilized to expand the capacity of the unit, is driven by a gear fixed on the input shaft, through an adapting gear having a reduction ratio that can be altered with exchangeable gears. German Auslegescrift No. 17 74 147 also appears to disclose a computer mechanism having four place capacity, as does French Patent No. 1,033,026.

In addition, mechanical computers having four-place price posting capability, and retrofit kits for expanding the capacity of three-place units, are commercially available. Despite all of such activity, a substantial need remains for means by which the capacity of a standard three-place unit volume price posting variator can be expanded to permit facile setting and posting of a four-digit price, wherein the highest order digit (i.e., the dollar place) is of selectively variable magnitude.

Accordingly, it is the principle object of the present invention to provide novel means in a variator by which the capacity for setting and posting the price can be expanded from three to four places, permitting facile selection of the magnitude of the added, highest-order digit.

It is also an object of the present invention to provide such means which can be retrofit into existing computer units.

A more specific object of the invention is to provide means of the foregoing nature which will permit the highest order place of the unit volume price to be selectively varied among five levels, enabling a price of from $0.000 to $4.999 to be posted, with the dollar setting automatically displayed.

Another object of the invention to provide such means which is relatively inexpensive to manufacture and facile to install, and will minimize any increase in torque loading and wear upon the parts of the unit.

Yet another object of the invention is to provide novel speed reduction mechanisms which permit decreases in the speeds of the output gears from the range arm assemblies, thereby further minimizing torque and undue wear of the parts.

A further object of the invention is to provide a novel variator having the foregoing features and advantages.

SUMMARY OF THE INVENTION

It has now been found that the foregoing and related objects of the invention are readily attained in a variator for a fuel pump computer, expanded by the provision of a supplemental range mechanism mounted in the frame thereof, and including a secondary gear stack comprised of a multiplicity of gears of different proportionate sizes affixed upon a shaft and disposed on an axis offset from that of the primary gear stack for operative connection to the metering device thereof. The supplemental range mechanism also includes means, other than the existing range arm assemblies of the variator, for selectively operatively connecting each of the gears of the secondary gear stack to the summing mechanism, whereby the rotary output from the secondary gear stack can be combined with the rotary output of the range arm assemblies, to generate a cumulatively proportionate rotary output from the summing mechanism.

Generally, both the primary and the secondary gear stacks will be cone gears, and the secondary cone gear will include a drive gear affixed on its shaft in direct meshing engagement with one of the gears of the primary cone gear; the cone gears will normally be oriented with their apices directed upwardly. Preferably, connecting means of the variator will comprise a selector assembly that is pivotably mounted adjacent the primary and secondary cone gears, and that includes an arm member, which is movable thereon along an axis parallel to the axis of pivoting thereof, and a selector gear rotatably mounted on the arm member for selective engagement with each of the gears of the secondary gear stack, to thereby establish operative connection to the primary summing mechanism. The axis of pivoting of the selector assembly and the axis of the secondary gear stack will usually be parallel to the primary gear stack axis, and the selector assembly will include a first shaft disposed on the axis of pivoting, upon which shaft a suitable spline member will be rotatably mounted. The arm member of the assembly will be slideably mounted on a second shaft, offset from and parallel to the first shaft, with the selector gear thereof in meshing engagement with the spline member. As a result, the selector gear and spline member will function respectively to input rotary motion to, and to output rotary motion from, the selector assembly. The "second" shaft will normally be affixed to the "first" shaft for selective movement through an arc thereabout to each of a plurality of fixed positions of the selector assembly, in each of which the selector gear thereof will be engaged with a different one of the gears of the secondary gear stack. The assembly will also usually have an additional fixed position on the arc of movement in which the selector gear is disengaged from the secondary gear stack, and the variator will additionally include means for securing the selector assembly in each of its fixed positions; desirably, the securing means will include a member that is engageable with the selector gear in the additional fixed position of the assembly, to lock the selector gear against rotation. Preferably, the securing means will be provided by an upstanding plate disposed substantially on the arc of movement of the selector assembly, and will have a slot comprised of a plurality of interconnected, vertically extending slot elements corresponding to the fixed positions of the assembly, with the arm member including a pin received in the slot and engageable within each of the slot elements, to selectively secure it in position.

In certain embodiments, the "first" shaft of the selector assembly will have a pinion element thereon in operative connection with a number wheel, and the variator will additionally include such a wheel mounted on the frame, and having price indicia thereon. The frame will have mounting means thereon for the number wheel, with a generally circular opening including a corrugated inner surface portion. The number wheel will have a generally cylindrical shank portion received in the opening of the mounting means, for rotatably mounting it therein, and the shank portion will have a resilient pawl element projecting radially therefrom into contact with the inner surface portion of the opening, for engagement within the grooves of the corrugations. The price indicia on the number wheel will correspond to the fixed positions of the selector assembly, with the pawl element serving to positively locate the angular position of the number wheel to properly display the indicium corresponding to the position of the selector assembly.

In the most desirable embodiments, the variator will additionally include a secondary rotary summing mechanism disposed on the shaft of one of the existing range arm assemblies. The secondary summing mechanism will be operatively connected to the range arm assembly and interposed between the connecting means of the supplemental range mechanism and the primary summing mechanism, to combine the outputs of the "one" range arm assembly and the supplemental range mechanism with those of the other range arm assemblies. The "one" range arm assembly may comprise a radially extending arm mounted upon its shaft, and carrying a selector gear that is operatively connected to the shaft to effect rotation thereof. The secondary summing mechanism will preferably comprise an input gear member, a drive gear, and an output gear member coaxially mounted on the shaft thereof, and a plurality of identical compound planetary gears disposed between the input and output gear members, and carried by the input gear member in circumferential meshing engagement with the drive gear. The drive gear will be affixed to the shaft for rotation therewith, and will be meshed with one of the gear elements of the planetary gears. The input and output gear members will be rotatable on the shaft, and will have external gear teeth extending about the entire outside circumference thereof for operative engagement with the connecting means of the supplemental range mechanism and with the primary summing mechanism, respectively. The output gear member will also have internal gear teeth extending entirely about an inside circumferential portion thereof, and meshed with second gear elements of each of the planetary gears. As a result, the secondary summing mechanism will combine rotary inputs from the shaft and the supplemental range mechanism, to generate a cumulative rotary output to the primary summing mechanisms.

In other perferred embodiments, the bale member of at least one of the range arm assemblies of the variator will have a speed reduction mechanism provided therein. Such a mechanism will desirably comprise first and second pinions mounted on the shaft of the assembly, and a compound gear rotatably mounted on the bale member with its gear elements in meshing engagement with the pinions. The first pinion will be affixed to the shaft, and the second pinion will be rotatable thereon. The pinions and gear elements will be of such relative sizes as to cause the second pinion to rotate at a slower speed than the first pinion, when driven thereby through the compound gear.

DETAILED DESCRIPTION OF THE DRAWINGS

Figure 1:
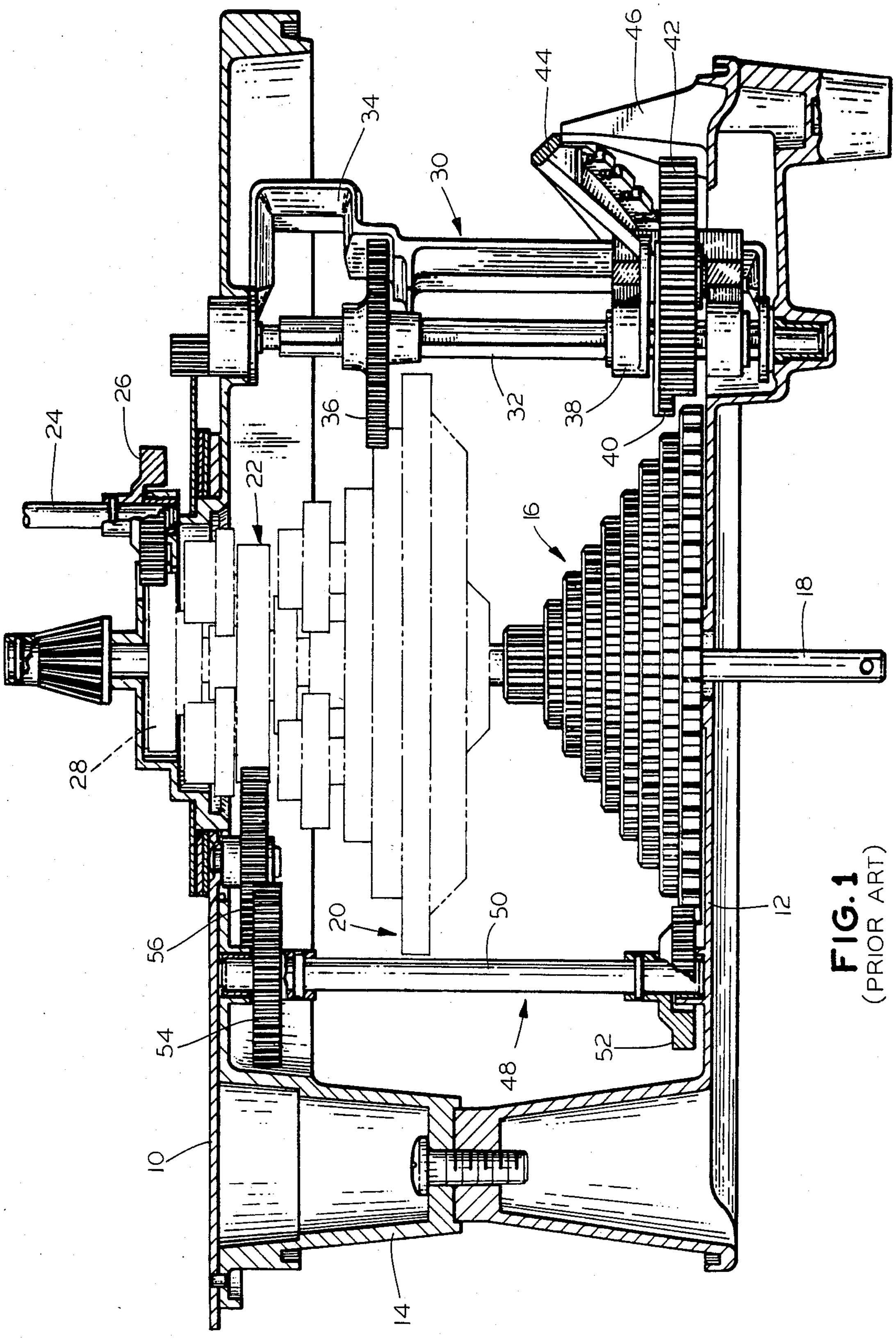
FIG. 1 (PRIOR ART)
FIG. 1 is a side elevational view, in partial section, of a prior art extended-range variator for a mechanical computer, with the differential summing mechanisms utilized therein shown in phantom line.

Shown in FIG. 1 is an extended range prior art variator, as described and illustrated in the above-identified Smilgys et al U.S. Pat. No. 4,136,573. A full understanding of the construction and operation of that unit can be had by reference to the patent; the descriptive portions thereof are hereby incorporated hereinto by reference, to the extent necessary for an understanding of the operation of the basic unit, and of modifications to be made thereto in accordance with the present invention. Suffice to say that the variator of FIG. 1 includes a cover plate 10 and a base plate 12, which are secured to one another by three posts 14 (only one of which is shown). A cone gear or gear stack, generally designated by the numeral 16 and consisting of nine proportional gear members stacked in decreasing order, is affixed to the center shaft 18, on which is rotatably mounted a primary differential summing mechanism and a secondary differential summing mechanism, generally designated by the numerals 20, 22, respectively, and shown in phantom line. The output shaft 24 has a pinion 26 affixed to its lower end, which is in meshing engagement with the output gear 28 of the secondary summing mechanism 22.

One of the three standard range arm assemblies utilized in the conventional variator, which is generally designated by the numeral 30, is illustrated and consists of a shaft 32 suitably journaled in the cover and base plates 10, 12, and having a pivotably mounted bale 34 and a fixedly mounted output gear 36 thereon. The shaft 32 also carries a range arm 38 which is slideably engaged with the bale 34 for conjoint pivotal movement, and an inner range arm gear 40, which is keyed to the shaft but is supported on the range arm 38 for axial shifting therewith. The range arm 38 carries an outer selector gear 42, by which the assembly 30 is brought into operative engagement with any of the members of the cone gear 16, in a conventional manner. The rack 44 is attached to the range arm 38 for pivotal and axial shifting therewith, and cooperates with a detent finger 46 formed on the base 12 for accurately positioning the selector gear 42.

Expansion of the pricing capacity of the prior art variator of FIG. 1 is accomplished by the provision of an auxillary take-off shaft assembly, generally designated by the numeral 48, and consisting of a shaft 50, to the opposite ends of which are affixed an input gear 52 and an output gear 54. The input gear 52 is in meshing engagement with the lowermost gear of the stack 16, and the output gear 54 is disposed for engagement with a selector gear 56. The selector gear 56 may be operatively connected to the secondary differential summing mechanism 22 to add the rotary signal that is applied to the auxillary take-off assembly 48 from the cone gear 16, thereby increasing the unit price by one dollar. The patent also discloses a second embodiment in which a selector gear arrangement is provided through which a second value can be established for the highest order price place, thereby expanding the capacity of the variator to add either a one dollar or a two dollar increment.

Figure 2:
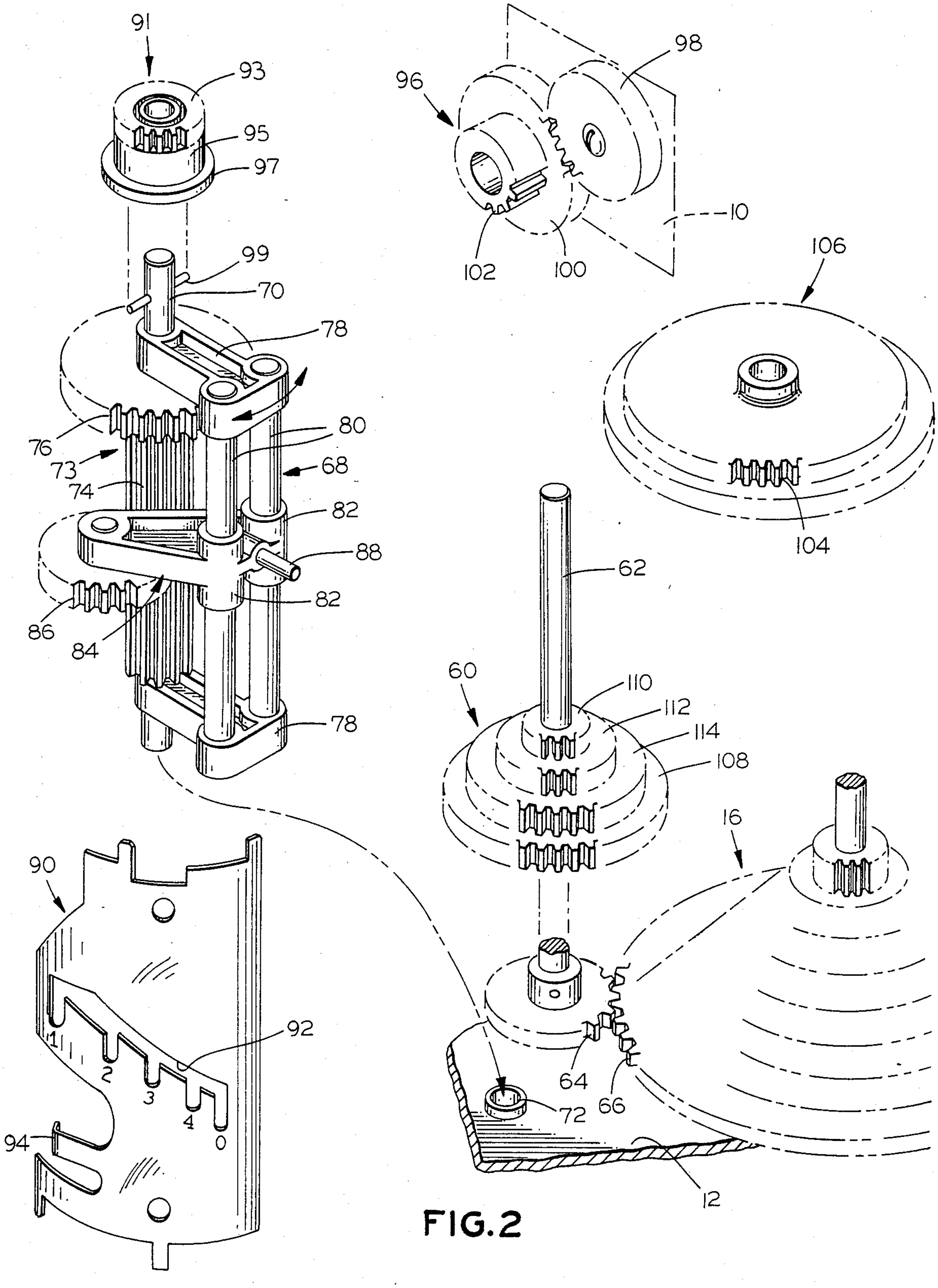
FIG. 2 is an exploded perspective view of mechanism for converting a standard variator to a four-place pricing unit, embodying the present invention.
Figure 3:
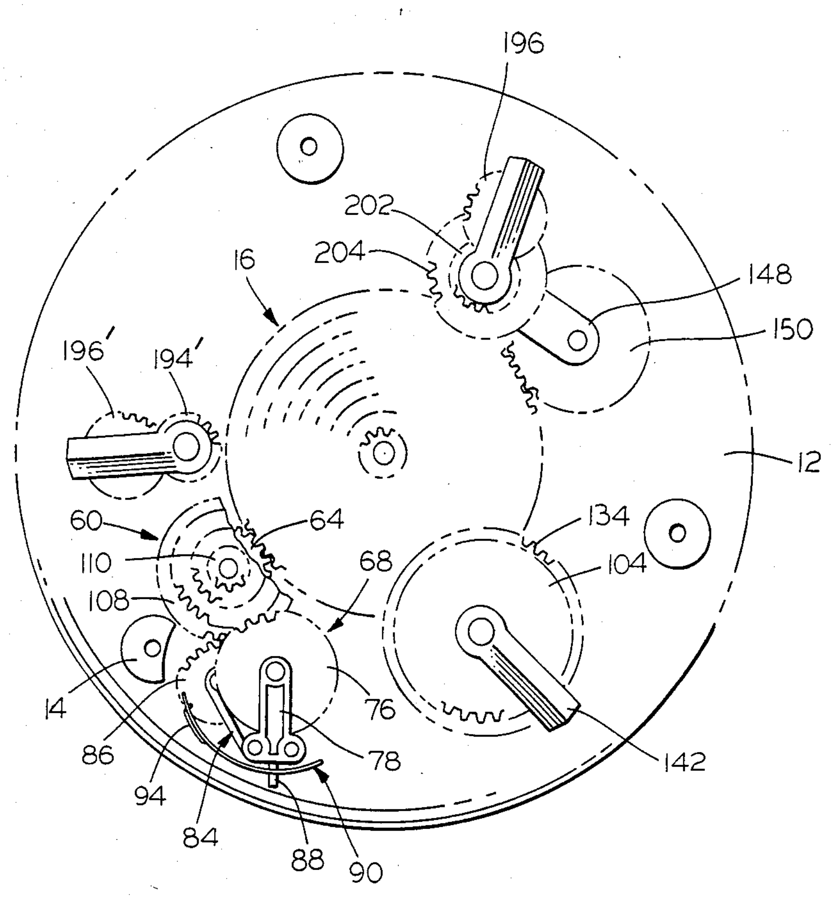
FIG. 3 is a top plan view of a variator embodying the present invention and modified from the unit shown in FIG. 1, as it would appear with the cover plate, the auxiliary range arm assembly, and with the differential summing mechanisms thereof removed.
Figure 4:
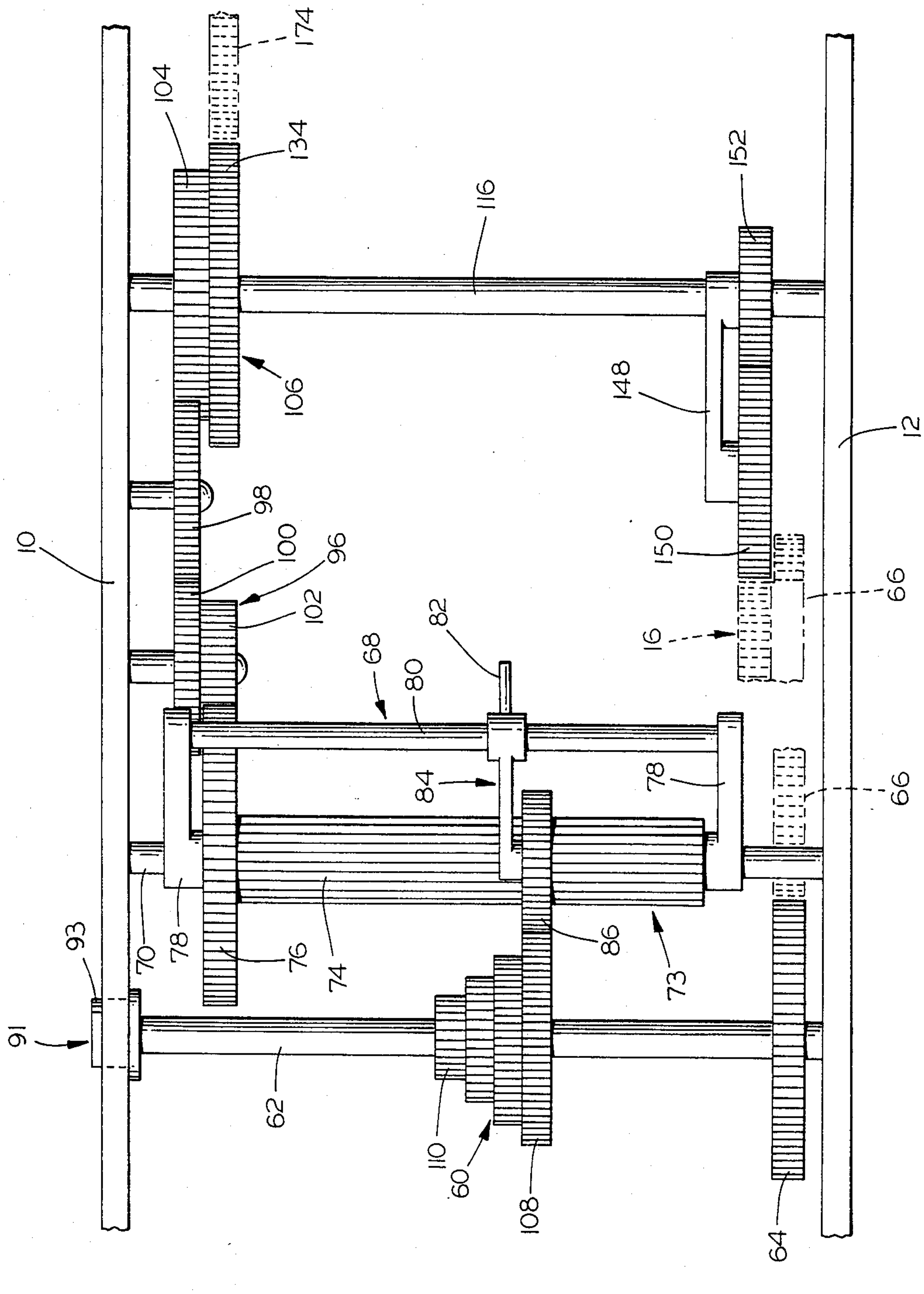
FIG. 4 is a schematic representation showing the supplemental range mechanism and secondary summing mechanism employed in the variator of the invention.

Turning now in detail to FIGS. 2–4 of the appended drawings, therein illustrated is the mechanism by which expanded price setting and posting capacity is provided in a variator, in accordance with the present invention. The use of numerals that are the same as those employed in FIG. 1 is to indicate that the parts involved are common to the structures involved.

More particularly, a secondary cone gear, generally designated by the numeral 60 and fixed upon a shaft 62 for rotation therewith, is journalled on the cover 10 and base 12 of the variator frame. A take-off gear 64 is pinned to the lower end of the shaft 62, and is in meshing engagement with the lowest gear member 66 of the primary cone gear 16, whereby rotation of the secondary gear stack 60 is effected. Mounted adjacent the secondary gear stack 60 is a supplemental range assembly, generally designated by the numeral 68, which includes a shaft 70, the lower end of which is received in a suitable bushing 72 inserted into the base plate 12. A spline member, generally designated by the numeral 73 and consisting of a cylindrical spline portion 74 and an enlarged gear portion 76, is rotatably mounted on the shaft 70, which also fixedly supports a pair of brackets 78, which extend radially therefrom adjacent the opposite ends of the spline member 73. Two parallel guide rods 80 are supported between the outer ends of the brackets 78, and adjacent sleeve portions 82 of a range arm, which is generally designated by the numeral 84, are slideably mounted thereon. The outer end of the arm 84 rotatably supports a selector gear 86, the arm being angled suitably to maintain the gear 86 in constant meshing engagement with the cylindrical portion 74 of the spline member 73. The arm 84 also mounts a pin 88, which projects radially outwardly from between the sleeve portions 82.

A slotted detent plate, generally designated by the numeral 90, is affixed between the cover plate 10 and the base plate 12 adjacent the arm assembly 68, and has a generally inclined compound slot 92 in which is received the pin 88 on the selector gear arm 84. The slot 92 has five vertical elements or branches at progressively higher levels, within any of which the pin 88 may be selectively engaged, each branch being designated to indicate a different position of the selector arm 84, corresponding to dollar increment values to be set and posted by the variator. A locking finger 94 is also integrally formed on the plate 90, for a purpose to be explained in greater detail hereinbelow.

Staked to the top of the shaft 70, by a transverse pin 99, is a number wheel synchronizer pinion, generally designated by the numeral 91, which consists of a gear portion 93, an adjacent bearing portion 95, and a flange portion 97. The pinion 91 projects through the cover plate, to position the gear portion 93 for engagement with the number wheel synchronizer link, as will also be described more fully below. The bearing portion 95 supports the end of the shaft 70 within the cover plate 10, with the flange portion 97 abutting against the underside to lock the assembly in position.

The cover plate 10 also rotatably mounts a compound idler gear, generally designated by the numeral 96, and a simple idler gear 98 in meshing engagement with the larger gear element 100 thereof. The smaller gear element 102 is disposed in meshing engagement with the enlarged gear portion 76 of the spline member 73 of the supplemental range assembly 68; the simple idler gear 98 is disposed in meshing engagement with the upper gear member 104 of a secondary differential, generally designated by the numeral 106, as will be described subsequently.

Figure 5:
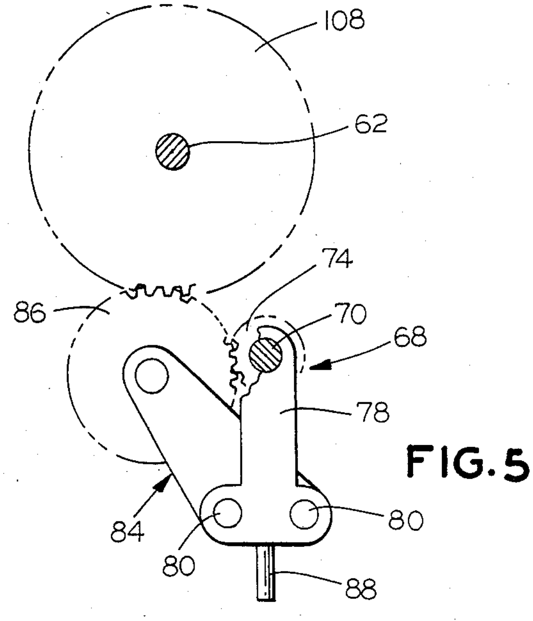
FIG. 5 is a fragmentary plan view of the selector assembly and secondary cone gear utilized in the present variator, showing the selector gear in meshing engagement with the largest gear member of the cone gear.
Figure 6:
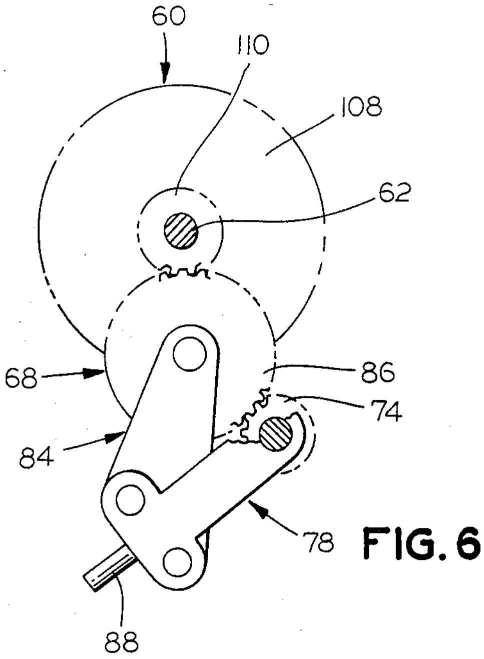
FIG. 6 is a view similar to FIG. 5, showing the selector assembly in a speed position, with the selector gear in meshing engagement with the smallest gear of the secondary gear stack.

In FIGS. 5 and 6, the two extreme operative positions of the supplemental range assembly 68, in cooperation with the secondary gear stack 60, are illustrated. As shown in FIG. 5, the selector gear 86 on the arm 84 is positioned in meshing engagement with the lowermost (i.e., largest) gear 108 of the stack; as so positioned, the pin 88 will be set in the branch of slot 92 in the support plate 90 marked "4". Obviously, this will cause the spline member 73 to rotate at its highest speed, corresponding to a $4.00 added price increment. Rotational and axial shifting of the range arm 84 to the position shown in FIG. 6 will cause the selector gear 86 to engage the smallest (i.e., uppermost) gear 110 of the secondary gear stack 60 and will permit the pin to enter the slot branch designated "1". This will, of course, cause the spline member to rotate at a much slower speed corresponding to a $1.00 price increment. As will be appreciated, the two middle gear elements 112, 114 can similarly be engaged by the selector gear 86 to cause the spline member to rotate at speeds intermediate the rates produced by engagement with the elements 108 or 110, to set price increases of $2.00 and $3.00, as indicated on the plate 90. With the pin 88 engaged in the "0" branch of the slot 92, the selector gear 86 will be disengaged from the secondary gear stack 60, and engaged by the lock-out finger 94 of the plate 90; this condition will, of course, exist when the variator is used to set a three-place price (i.e., less than one dollar).

Figure 7:
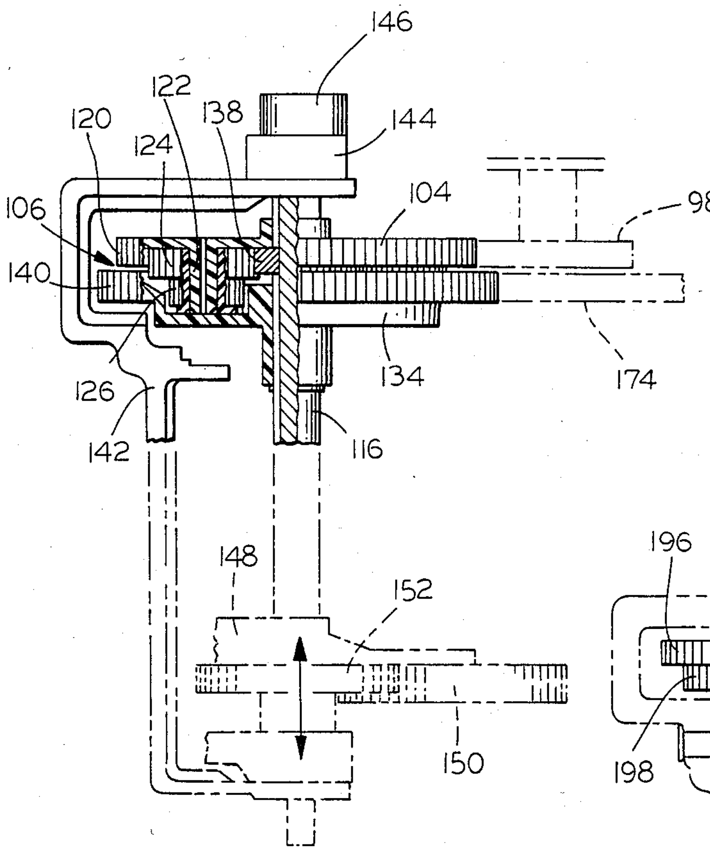
FIG. 7 is a fragmentary side elevational view, in partial section, showing a range arm assembly utilized in the variator of the invention, modified by the addition of a secondary summing mechanism on the upper portion of the shaft thereof, and also showing in phantom line idler transfer gears affixed to the cover of the unit.
Figure 8:
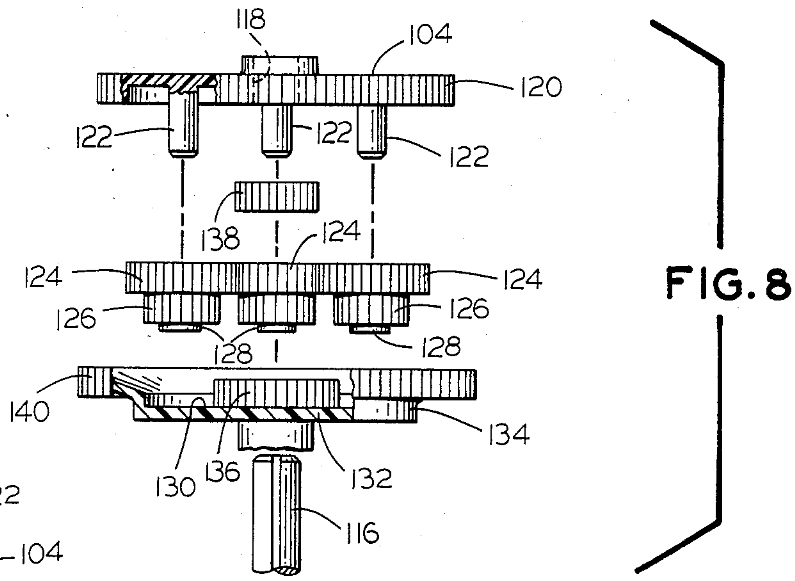
FIG. 8 is an exploded fragmentary elevational view, in partial section, of the secondary summing mechanism.

The signal generated from the supplemental range assembly 68 is, as previously indicated, summed with the signals from the "standard" range arm assemblies (which are similar to that which is shown at 30 in FIG. 1, but modified in a manner to be described hereinbelow) through the secondary summing mechanism 106, in cooperation with the primary summing mechanism 20. As seen in FIGS. 7 and 8, the secondary summing mechanism 106 is mounted upon the shaft 116 of the "ten cent" range arm assembly. The upper gear plate 104 of the mechanism 106 has a central aperture 118 through which the shaft 116 passes, and it has toothed gear portion 120 extending circumferentially entirely thereabout. Three depending studs 122 are integrally formed on the member 104, and each mounts one of three identical compound planetary gears; the gears consist of larger gear elements 124 and smaller gear elements 126. A bearing ridge 128 is provided on the lower face of each planetary gear, facilitating their sliding movement upon the annular surface 130, which is defined on the bottom wall 132 of the lower gear member 134. The lower gear elements 126 of the planetary gears are in meshing engagement with the hub gear 136 that is integrally formed at the center of the lower gear member 134 and the upper gear elements 124 thereof are in meshing engagement with a pinion 138, which is disposed centrally thereof and is keyed to the shaft 116. Consequently, the inputs to the shaft 116 and to the upper gear member 104 are mechanically summed, with the cumulative (but proportionately reduced) output being applied to the lower gear member 134. The outer circumferential gear portion 140 thereof engages one of the gear members of the primary differential summing mechanism 20, as will be described more fully below.

Figure 9:
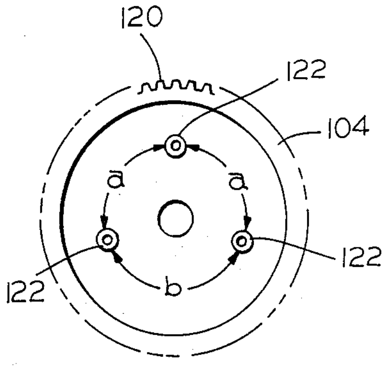
FIG. 9 is a bottom plan view, drawn to a reduced scale, of the input gear member of the secondary summing mechanism.

From FIG. 9, it is seen that the studs 122 by which the planetary gears are mounted on the upper gear member 104 are triangularly disposed, and it will be noted that the angles therebetween are unequal, the angle "b" having a value greater than angles "a" which are the same; i.e., the planetary gears are disposed in a relationship of "isosceles triangularity". This enables the use of planetary gears having an odd number of teeth, in turn permitting the secondary summing mechanism to be reduced in size, making it most practical for installation in the space available within a standard variator housing. In the preferred instances, the value of the angle "a" will be 108°, and that of angle "b" will be 144°.

Although the secondary summing mechanism shown in FIGS. 8 and 9 is preferably used in the instant variator, the particular construction hereinabove described does not constitute a part of the present invention. It is the subject matter of copending application Ser. No. 453,331 entitled "Differential Summing Mechanism", filed in the name of Richard L. Hockmuth and of common assignment herewith.

As shown in FIG. 7, the shaft 116 is journalled in an axially extending bale 142, the top of which is configured to define a bearing portion 144 and a sector gear portion 146 thereabove. The latter projects through the cover plate 10 for engagement with a suitable synchronizer link to operate the appropriate number wheels, in a conventional manner, and the bearing portion 144 is received in an appropriate opening of the cover to support the assembly; the opposite end of the shaft 116 is journaled in the base plate 12. The range arm structure 148 is pivotably mounted upon the shaft 116, and supports a selector gear 150 on its outer end; its inner portion supports a rack for selective engagement with a detent finger (neither of which is shown) as discussed in connection with FIG. 1. The selector gear 150 is in meshing engagement with a drive gear 152, which is affixed to the shaft 116 to effect rotation thereof when the selector gear 150 is engaged with one of the gear elements of the primary cone gear 16.

Figure 10:
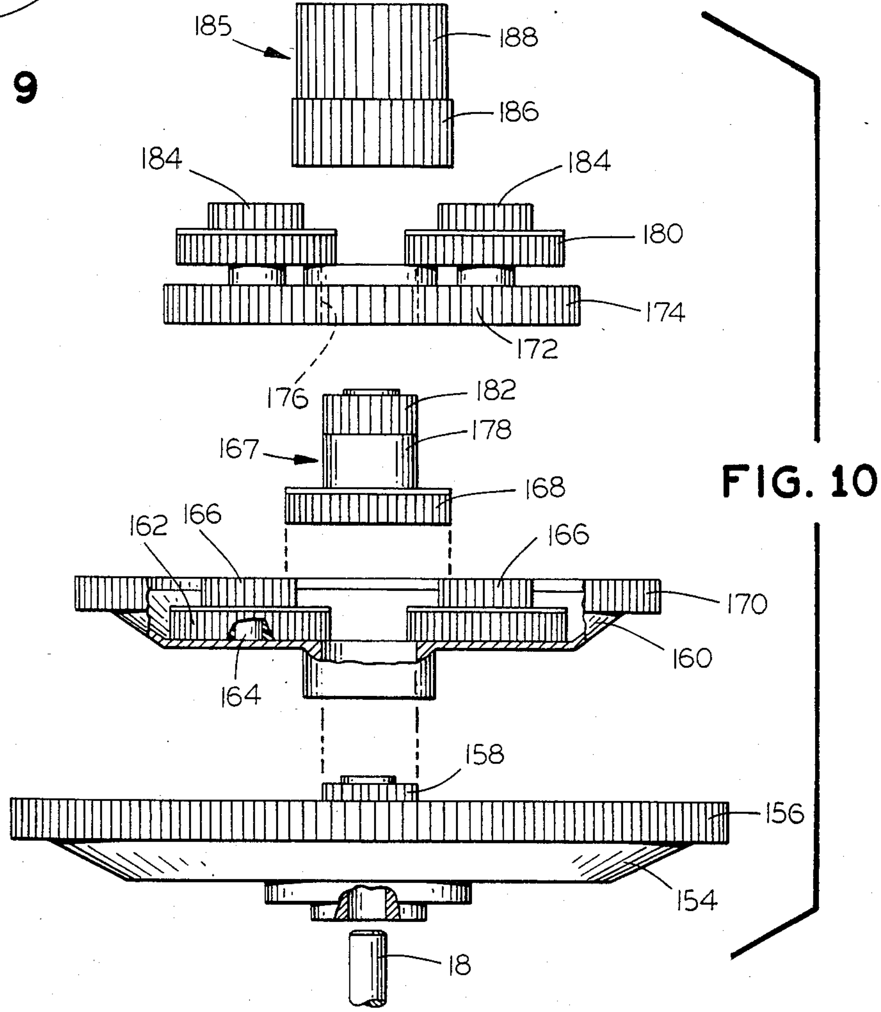
FIG. 10 is a fragmentary exploded side elevational view, in partial section, of the primary differential summing mechanism utilized in the variator.

The primary differential summing mechanism utilized in the instant variator is similar to the integrator shown at 20 in FIG. 1, in that three input gear members of progressively different sizes are employed. The lowermost (largest) gear member 154 (see FIG. 10) is rotatably mounted on the center shaft 18, and has a toothed portion 156 extending circumferentially entirely thereabout, and a central toothed hub portion 158. The intermediate gear member 160, which has a circumferential toothed portion 170 extending thereabout, is disposed within the lower gear member 154, with the lower gear elements 162 of the compound planetary gears, which are rotatably mounted on the upstanding posts 164 (only one of which is visible), in meshing engagement with the hub 158. The upper gear elements 166 of the planetary gears are in meshing engagement with the lower gear element 168 of a compound central gear, generally designated by the numeral 167, which is also mounted upon the shaft 18. The upper gear member 172 has a similar external circumferential toothed portion 174, and a central aperture 176 which receives a bearing portion 178 of the compound central gear 167, in coaxially mounted relationship. It also has a pair of compound planetary gears rotatably carried thereon (by shafts not shown), the lower gear elements 180 of which are in meshing engagement with the upper gear element 182 of the compound gear 167. The upper gear elements 184 of the planetary gears mesh with the lower gear element 186 of the uppermost compound central gear, generally designated by the numeral 185, which is similarly journaled on the shaft 18. The cumulative output from the primary summing mechanism is taken from the upper gear element 188, which protrudes through the top plate 10 of the variator frame; the element 188 is functionally comparable to the gear element 28, mentioned in connection with FIG. 1.

Figure 11:
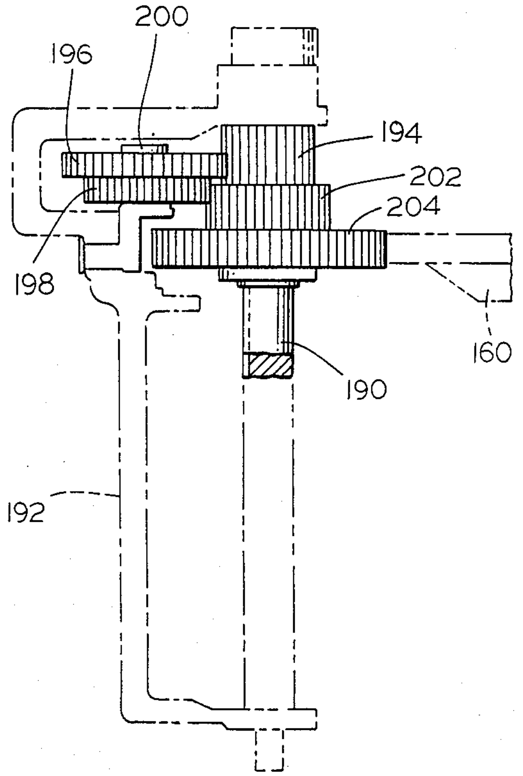
FIG. 11 is a fragmentary side elevational view of a range arm assembly, including a speed reduction mechanism in accordance with the present invention.

The "one cent" range arm assembly utilized in the instant variator is depicted in FIG. 11. Although of generally conventional construction, it includes a novel gear-reduction mechanism, which serves to reduce the angular speed of rotation of the output gear to a value one-half that of the input shaft. More particularly, the shaft 190 of the assembly is journaled in the ends of the bale 192, and has an input pinion 194 affixed to its upper end. A compound gear consisting of an upper element 196 and a lower element 198 is rotatably mounted on a stub shaft 200 formed on the laterally extending portion of the bale, with its upper gear element 196 in meshing engagement with the pinion 194. The lower gear element 198 is engaged with the upper gear element 202 of a compound output gear, which is rotatably mounted on the shaft 190, and the lower element 204 of the compound gear provides the rotary output from the assembly; as shown in FIG. 11, it is engaged with the intermediate gear member 160 of the primary summing mechanism shown in FIG. 10. By way of specific example, the two gear elements 196, 198 of the compound idler gear, and the upper gear element 202 of the compound output gear, may all have 24 teeth, and the pinion 194 may have 12; this will cut the speed in half.

Figure 12:
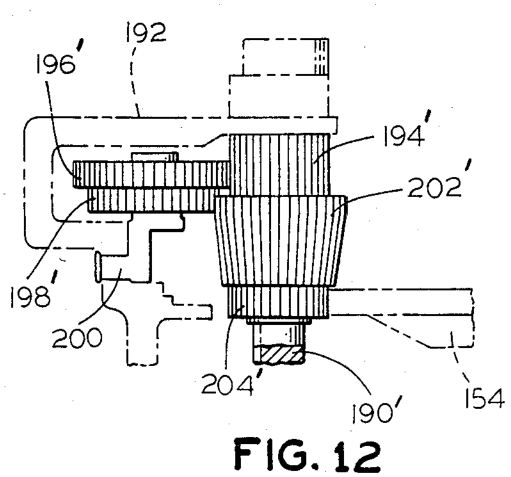
FIG. 12 is a view similar to FIG. 9, showing a second range arm assembly having the speed-reduction feature.

A similar mechanism is provided on the "one-tenth cent" assembly, as shown in FIG. 12. Since, as a practical matter, only the sizes of the various gear elements will vary, comparable (sometimes primed) numbers are used, and detailed description is unnecessary. In this instance, however, the output gear element 204′ would be engaged with the lowermost gear member 154 of the summing mechanism. It should be appreciated that the desired reduction in speed can be achieved by other means, such as by appropriate modification of the primary summing mechanism, albeit that the described approach will be preferred in many instances.

In operation, the selector gears of each of the three range arm assemblies shown in FIGS. 7, 11, and 12 (the selector gear 150 being illustrated, however, only in FIG. 7) will be set into engagement with the proper gear of the primary stack 16, to impart rotation thereto at a speed proportionate to the desired value of the place of the unit price for which the particular range arm assembly is to function. This is, of course, comparable to use of a conventional variator. The outputs from the gear elements 204, 204′ of the one cent and one-tenth cent range arm assemblies are applied directly to the primary summing mechanism through the engaged gear members 160, 154, as previously described.

The selector gear 150 of the ten cent range arm assembly, shown in FIG. 7, will be set into engagement with one of the gear members of the primary gear stack 16 in like manner. However, its signal will be impressed upon the primary summing mechanism, through engagement of the lower gear member 134 of the secondary summing mechanism 106 with gear member 174 of the primary integrator, as a cumulative value with that which is taken from the supplemental assembly 68, through connection with the upper gear member 104. The input signal is transferred to member 104 from the gear portion 76 of the spline member 73, through the compound idler gear 96 and the simple idler gear 98, which are mounted under the cover plate 10. The value of the signal introduced to the secondary summing mechanism 106 through the member 104 will, as previously indicated, be representative of the dollars place of the unit volume price, and will be determined by engagement of the take-off gear 86 with the appropriate gear of secondary gear stack 60. In this manner, the instant variator may readily be set and post a unit volume price of from $0.000 to $4.999.

Figure 13:
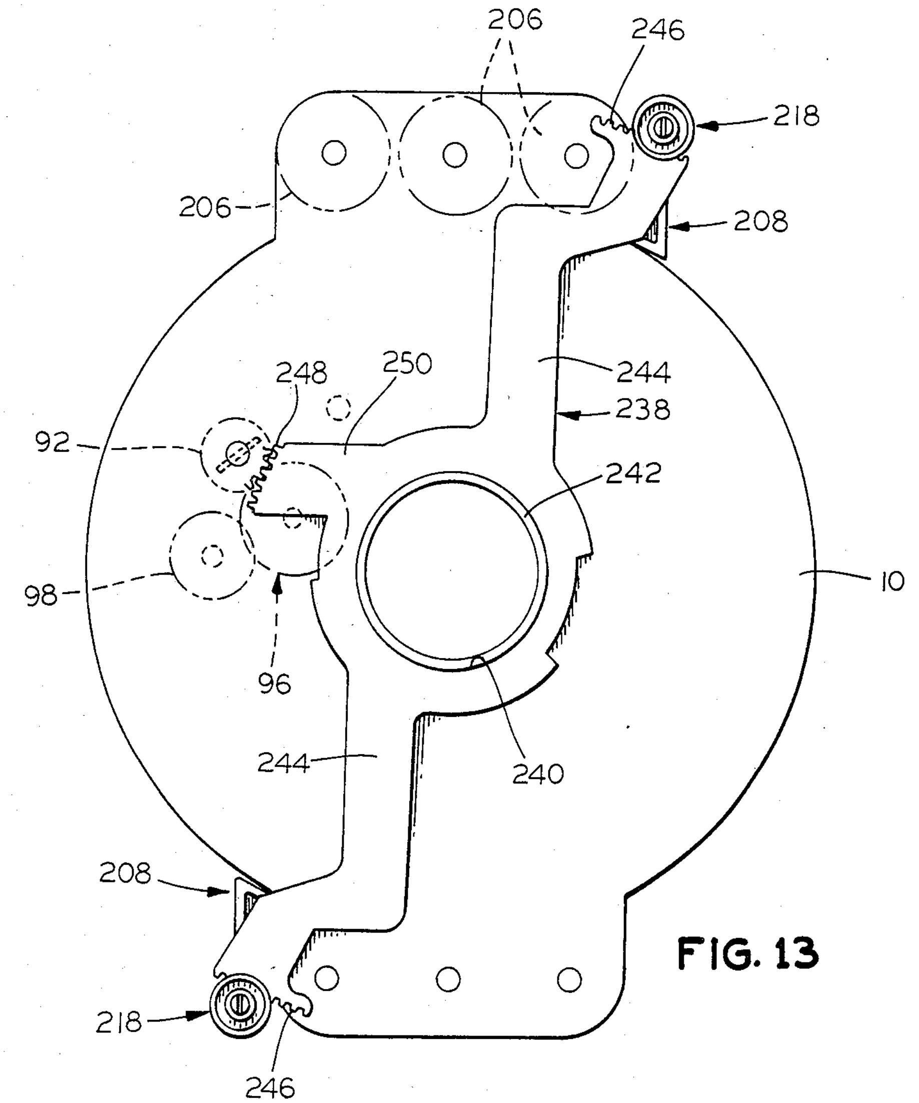
FIG. 13 is a top plan view of a variator embodying the invention, showing the added dollar number wheel and associated synchronizer link, the plastic dome that would normally be provided thereon being removed for clarity of illustration.
Figure 14:
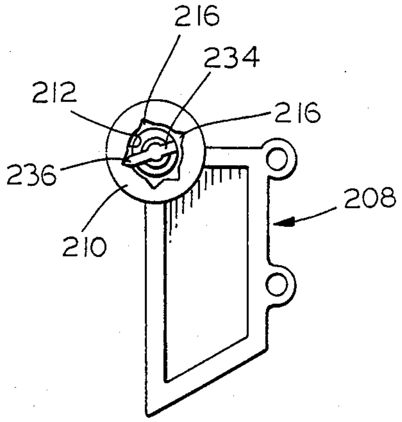
FIG. 14 is a bottom view of the mounting bracket and dollar wheel assembly, drawn to a scale enlarged from that of FIG. 13.
Figure 15:
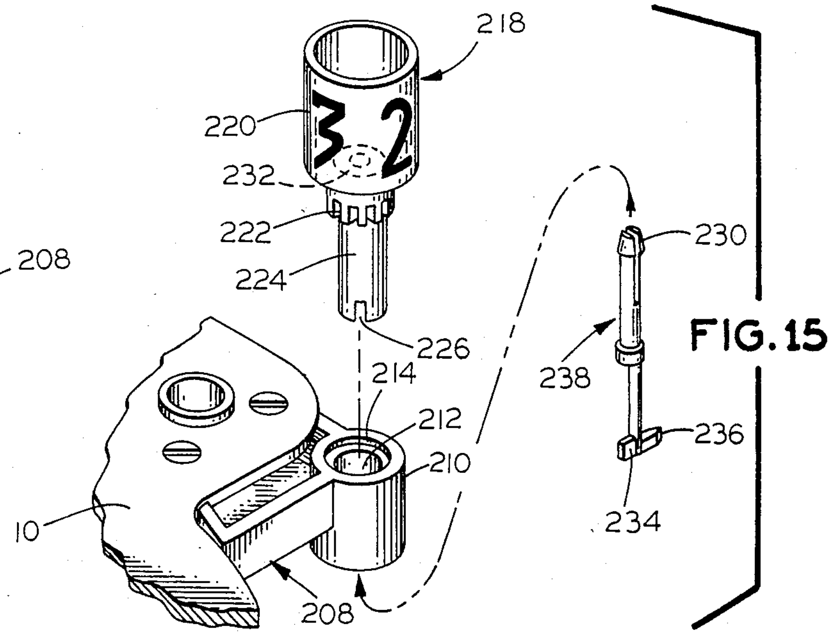
FIG. 15 is an exploded fragmentary perspective view of the added wheel assembly and mounting means, drawn to a greatly enlarged scale and as viewed from the side of the unit.

Turning finally to FIGS. 13–15 of the drawings, therein illustrated is the means by which the dollar number wheel is mounted and operated. Standard number wheels 206 (one set of three of which are shown in phantom line) are rotatably mounted upon the cover plate 10, to each side of which a supplemental mounting bracket, generally designated by the numeral 208, is affixed. The bracket 208 includes a cylindrical collar portion 210 at one corner, through which extends a generally circular bore 212 having an annular countersink portion 214 at its upper end. As best seen in FIG. 14, the underside of the collar portion 210 has a recess of corregated cross-sectional configuration formed thereinto, at the lower end of the bore 212, which provides five axially-extending detent grooves 216.

The number wheel, generally designated by the numeral 218, consists of a cylindrical display portion 220, on the surface of which dollar value numerals are provided. A gear ring 222 is disposed beneath the cylindrical portion 220, and a shank portion 224 of circular cross section extends therefrom; the latter is slotted diametrically at 226 (only one side slot being visible). A hammer-like insert, generally designated by the numeral 238, extends through the shank portion 226, with its enlarged and bifurcated tail portion 230 projecting through and beyond the internal wall 232, which is apertured for that purpose. As so assembled, the wedge-shaped head 234 at the opposite end of the insert member 228 extends transversely through the diametrical slots 226, with its tapered nose portion 236 protruding therebeyond; the shaft of the insert member is sufficiently resilient to spring load the head 234. As will be appreciated from the illustration of FIG. 14, the nose portion 236 of the head 234 engages within the grooves 216 of the corrugated recess in the collar 210, thereby positively locating it at each of five angularly displaced positions and accurately aligning the numbers for viewing through a window in the dial face of the pump. Such a feature is valuable to counteract the effects of backlash produced by the several mechanisms of the variator, under the operating torques involved.

As seen in FIG. 13, the two diametrically disposed number wheels 218 are operated from a common synchronizer link, generally designated by the numeral 238, which has a centralized circular opening 240 by which it is mounted on the upstanding collar 242 of the cover plate 10. The link 238 has two elongated arms 244, each of which has a rack of teeth 246 at its outer end portion 246. These teeth engage the gear ring 222 on each of the number wheels 218, thereby turning the wheels when the link 238 is pivoted on the collar 242. Such motion is imparted by engagement of the teeth of a third portion 248 on a short arm 250 with the upper gear portion 92 of the pinion 91. Hence, pivoting of the supplemental range assembly 68, to achieve the several positions of engagement between the selector gear 86 and the gear members of the secondary cone gear 60, will automatically cause the number wheels 218 to display the appropriate dollar price setting; a blank will register when the supplemental assembly is in its disengaged, lock-out position.

As will be apparent to those skilled in the art, many changes could be made in the variator described herein without departing from the concepts of the invention. For example, rather than being disposed in the orientation shown, the secondary cone gear could be inverted so as to position the larger gear elements above the smaller. Indeed, this would have the advantage of avoiding any tendency for the cooperating selector gear to drag upon the upper surface of an underlying gear element, as might otherwise occur. It should also be appreciated that, although the variator described is designed to provide a $4.999 pricing capacity, the same principles are of course applicable to expand the range by less or more than four one-dollar increments (e.g., to only $2.999 or $3.999). In that event, the number of steps of the secondary cone gear, and the cooperating parts (e.g., the detent plate), would be changed appropriately.

Thus, it can be seen that the present invention provides novel means in a variator, and a variator embodying such means, by which the capacity for setting and posting the price can be expanded from three to four places, permitting facile selection of the magnitude of the added, highest-order digit. The means provided can be retrofit into existing mechanical computer units, and will permit the highest order place of the unit volume price to be selectively varied among five levels, enabling a price of from $0.000 to $4.999 to be posted, with the dollar setting automatically displayed. The mechanism of the invention is relatively inexpensive to manufacture and facile to install, and is so designed as to minimize any increase in torque loading and wear upon the parts of the unit. The invention also provides novel speed reduction mechanisms which permit the speed of the output gears from the range arm assemblies to be decreased, thereby further minimizing torque and undue wear of the parts.

Having thus described the invention, what is claimed is:

1. In a variator for a fuel pump computer having a frame, a rotatable primary cone gear stack mounted therein comprised of a multiplicity of gears of different proportionate sizes affixed upon a shaft for operative connection to a fuel pump metering device, three range arm assemblies mounted in said frame and having means for selective meshing engagement with each of said gears of said primary gear stack and having a shaft offset from the axis thereof, and a primary rotary summing mechanism coaxially mounted with said primary gear stack for operative engagement with said range arm assemblies to combine the rotary outputs thereof; the improvement comprising a supplemental range mechanism mounted on said frame and including: a secondary cone gear stack comprised of a multiplicity of gears of different proportionate sizes affixed upon a shaft and disposed on an axis offset from that of said primary gear stack, said secondary cone gear including a drive gear affixed upon said shaft thereof in direct meshing engagement with one of the gears of said primary cone gear for operative connection to said metering device, and means other than said three range arm assemblies for selectively operatively connecting each of said gears of said secondary gear stack to said primary summing mechanism, said other means comprising a selector assembly pivotably mounted adjacent said primary and secondary cone gear stacks, said assembly including an arm member which is movable thereon along an axis parallel to the axis of pivoting thereof, and a selector gear rotatably mounted on said arm member for selective engagement with each of said gears of said secondary cone gear stack to establish such operative connection with different proportionate input rates, whereby the rotary output from said secondary gear stack can be combined with the rotary output of said range arm assemblies to generate a cumulative proportionate rotary output from said primary summing mechanism.

2. The variator of claim 1 wherein said primary and secondary cone gears are oriented with their apices directed upwardly.

3. The variator of claim 1 wherein said axis of pivoting of said selector assembly, and said axis of said secondary gear stack, are parallel to said primary gear stack axis.

4. In a variator for a fuel pump computer having a frame, a rotatable primary gear stack mounted therein comprised of a multiplicity of gears of different proportionate sizes affixed upon a shaft for operative connection to a fuel pump metering device, a plurality of range arm assemblies mounted in said frame and having means for selective meshing engagement with each of said gears of said primary gear stack and having a shaft offset from the axis thereof, and a primary rotary summing mechanism coaxially mounted with said primary gear stack for operative engagement with said range arm assemblies to combine the rotary outputs thereof; the improvement comprising a supplemental range mechanism mounted on said frame and including: a secondary gear stack comprised of a multiplicity of gears of different proportionate sizes affixed upon a shaft and disposed on an axis offset from that of said primary gear stack for operative connection to said metering device, and means other than said plurality of range arm assemblies for selectively operatively connecting each of said gears of said secondary gear stack to said primary summing mechanism, said other means comprising a selector assembly pivotably mounted adjacent said primary and secondary gear stacks, said axis of pivoting of said selector assembly, and said axis of said secondary gear stack, being parallel to said primary gear stack axis, said selector assembly including a first shaft on said axis of pivoting thereof, with a spline member rotatably mounted thereon, and a second shaft offset from and parallel to said first shaft, an arm member which is movable on said selector assembly along an axis parallel to the axis of pivoting thereof, and a selector gear rotatably mounted on said arm member for selective engagement with each of said gears of said secondary gear stack to establish such operative connection to said primary summing mechanism with different proportionate input rates, said arm member of said selector assembly being slideably mounted on said second shaft with said selector gear thereof in meshing engagement with said spline member, said selector gear and spline member functioning to input and output rotary motion to and from said selector assembly, respectively, whereby the rotary output from said secondary gear stack can be combined with the rotary output of said range arm assemblies to generate a cumulative proportionate rotary output from said primary summing mechanism.

5. The variator of claim 4 wherein said second shaft is affixed to said first shaft for movement, through an arc about the axis thereof, to each of a plurality of fixed positions of said selector assembly in which said selector gear thereof is selectively engaged with a different one of said gears of said secondary gear stack.

6. The variator of claim 5 wherein said selector assembly has an additional fixed position on said arc of movement in which said selector gear thereof is disengaged from said secondary gear stack, and wherein said variator additionally includes means for securing said selector assembly in each of said fixed positions thereof.

7. The variator of claim 6 wherein said securing means includes a member that is engageable with said selector gear in said additional fixed position to lock said selector gear against rotation on said arm member.

8. The variator of claim 6 wherein said securing means comprises an upstanding plate disposed substantially on said arc of movement, said plate having a slot comprised of a plurality of interconnected, vertically extending slot elements corresponding to said fixed positions of said selector assembly, and wherein said arm member of said assembly includes a pin received in said slot and engageable within each of said slot elements to selectively secure said assembly in said fixed positions.

9. The variator of claim 4 wherein said first shaft has gear means thereon for operative connection to a number wheel which has indicia for displaying the value of the place of the unit volume price corresponding to each fixed position of said selector assembly.

10. The variator of claim 9 additionally including such a number wheel mounted on said frame, said frame having mounting means thereon with a generally circular opening including a corrugated inner surface portion, and said number wheel having a generally cylindrical shank portion received in said opening of said mounting means for rotatably mounting said number wheel therein, said shank portion having a resilient pawl element projecting radially therefrom into contact with said inner surface portion of said mounting means for engagement within the grooves of the corrugations, said indicia on said number wheel corresponding to said fixed positions of said selector assembly, whereby said pawl element will serve to positively locate the angular position of said number wheel to properly display the indicium corresponding to said selector assembly position.

11. The variator of claim 4 wherein said second shaft of said selector assembly comprises a pair of parallel shafts on which said arm member is mounted, said pair of shafts preventing pivoting of said arm member relative to said first shaft.

12. In a variator for a fuel pump computer having a frame, a rotatable primary gear stack mounted therein comprised of a multiplicity of gears of different proportionate sizes affixed upon a shaft for operative connection to a fuel pump metering device, a plurality of range arm assemblies mounted in said frame and having means for selective meshing engagement with each of said gears of said primary gear stack and having a shaft offset from the axis thereof, and a primary rotary summing mechanism coaxially mounted with said primary gear stack for operative engagement with said range arm assemblies to combine the rotary outputs thereof; the improvement comprising a supplemental range mechanism mounted on said frame and including: a secondary gear stack comprised of a multiplicity of gears of different proportionate sizes affixed upon a shaft and disposed on an axis offset from that of said primary gear stack for operative connection to said metering device, and means other than said plurality of range arm assemblies for selectively operatively connecting each of said gears of said secondary gear stack to said primary summing mechanism; and a secondary rotary summing mechanism disposed on the shaft of one of said plurality of range arm assemblies and operatively connected thereto, said secondary summing mechanism being operatively interposed between said other means of said supplemental range mechanism and said primary summing mechanism to combine the outputs of said one range arm assembly and said supplemental range mechanism with those of the other range arm assemblies, whereby the rotary output from said secondary gear stack can be combined with the rotary output of said range arm assemblies to generate a cumulatively proportionate rotary output from said primary summing mechanism.

13. The variator of claim 12 wherein said one range arm assembly comprises a radially extending arm mounted upon said shaft thereof and carrying a selector gear that is operatively connected to said shaft to effect its rotation, said secondary summing mechanism comprising an input gear member, a drive gear, and an output gear member coaxially mounted on said shaft, and a plurality of identical compound planetary gears disposed between said input and output gear members and carried by said input gear member in circumferential meshing engagement with said drive gear, each of said planetary gears having at least two gear elements thereon, said drive gear being affixed to said shaft for rotation therewith and being meshed with one of the gear elements of said planetary gears, said input and output gear members having external gear teeth extending about the entire outside circumference thereof for operative engagement with said other means of said supplemental range mechanism and with said primary summing mechanism, respectively, and being rotatable on said shaft, said output gear member also having internal gear teeth extending entirely about an inside circumferential portion thereof and meshed with second gear elements of each of said planetary gears, whereby said secondary summing mechanism will combine rotary inputs from said shaft and said supplemental range mechanism to generate a cumulative rotary output to said primary summing mechanisms.

14. The variator of claim 13 wherein said other means comprises a selector assembly pivotably mounted adjacent said primary and secondary gear stacks, said assembly including an arm member which is movable thereon along an axis parallel to the axis of pivoting thereof, and a selector gear rotatably mounted on said arm member for selective engagement with each of said gears of said secondary gear stack to establish such operative connection to said primary summing mechanism with different proportionate input rates.

15. In a variator for a fuel pump computer having a frame, a rotatable primary gear stack mounted therein comprised of a multiplicity of gears of different proportionate sizes affixed upon a shaft for operative connection to a fuel pump metering device, a plurality of range arm assemblies mounted in said frame and having means for selective meshing engagement with each of said gears of said primary gear stack and having a shaft offset from the axis thereof, and a primary rotary summing mechanism coaxially mounted with said primary gear stack for operative engagement with said range arm assemblies to combine the rotary outputs thereof; the improvement comprising a supplemental range mechanism mounted on said frame and including: a secondary gear stack comprised of a multiplicity of gears of different proportionate sizes affixed upon a shaft and disposed on an axis offset from that of said primary gear stack for operative connection to said metering device, and means other than said plurality of range arm assemblies for selectively operatively connecting each of said gears of said secondary gear stack to said primary summing mechanism; and a radially offset, axially extending bale member pivotably mounted upon said shaft of at least one of said range arm assemblies, and a speed reduction mechanism comprising first and second pinions mounted on said shaft thereof and a compound gear rotatably mounted on said bale member, said compound gear having first and second gear elements in meshing engagement with said first and second pinions, respectively, said first pinion being affixed to said shaft and said second pinion being rotatable thereon, said pinions and gear elements being of such relative sizes as to cause said second pinion to rotate at a slower speed than said first pinion when driven thereby through said compound gear, whereby said rotary output from said secondary gear stack can be combined with the rotary output of said range arm assemblies to generate a cumulatively proportionate rotary output from said primary summing mechanism.

16. In a variator for a fuel pump computer having a frame, a rotatable primary gear stack mounted therein comprised of a multiplicity of gears of different proportionate sizes affixed upon a shaft for operative connection to a fuel pump metering device, a plurality of range arm assemblies mounted in said frame and having means for selective meshing engagement with each of said gears of said primary gear stack and having a shaft offset from the axis thereof, and a primary rotary summing mechanism coaxially mounted with said primary gear stack for operative engagement with said range arm assemblies to combine the rotary outputs thereof; the improvement comprising: (a) a supplemental range mechanism mounted in said frame and including a secondary gear stack comprised of a multiplicity of gears of different proportionate sizes affixed upon a shaft and disposed on an axis offset from that of said primary gear stack for operative connection to said metering device, and means other than said plurality of range arm assemblies for selectively operatively connecting each of said gears of said secondary gear stack to said primary summing mechanism; and (b) a secondary rotary summing mechanism disposed on the shaft of one of said plurality of range arm assemblies and operatively connected thereto, said secondary summing mechanism being operatively interposed between said other means of said supplemental range mechanism and said primary summing mechanism to combine the outputs of said one range arm assembly and said supplemental range mechanism with those of the other range arm assemblies, whereby the rotary output from said secondary gear stack can be combined with the rotary output of said range arm assemblies to generate a cumulatively proportionate rotary output from said primary summing mechanism.

17. The variator of claim 16 wherein said other means comprises a selector assembly pivotably mounted adjacent said primary and secondary gear stacks, said assembly including an arm member which is movable thereon along an axis parallel to the axis of pivoting thereof, and a selector gear rotatably mounted on said arm member for selective engagement with each of said gears of said secondary gear stack to establish such operative connection to said primary summing mechanism with different proportionate input rates.

18. The variator of claim 17 wherein said selector assembly includes a first shaft on said axis of pivoting, with a spline member rotatably mounted thereon, and a second shaft offset from and parallel to said first shaft, said arm member of said selector assembly being slideably mounted on said second shaft with said selector gear thereof in meshing engagement with said spline member, whereby said selector gear and spline member function to input and output rotary motion to and from said selector assembly, respectively.

19. The variator of claim 18 wherein said frame has transfer means thereon comprised of at least one idler gear rotatably mounted to operatively connect said spline member to said secondary summing member.

20. The variator of claim 19 wherein said spline member includes a gear element of enlarged diameter, and wherein said transfer means comprises a compound gear consisting of two gear elements, and a simple gear, said enlarged diameter gear element of said spline member being in meshing engagement with one element of said compound gear, with the other element thereof being in meshing engagement with said secondary summing mechanism.

21. The variator of claim 16 wherein said one range arm assembly comprises a radially extending arm mounted upon said shaft thereof and carrying a selector gear that is operatively connected to said shaft to effect its rotation, said secondary summing mechanism comprising an input gear member, a drive gear, and an output gear member coaxially mounted on said shaft, and a plurality of identical compound planetary gears disposed between said input and output gear members and carried by said input gear member in circumferential meshing engagement with said drive gear, each of said planetary gears having at least two gear elements thereon, said drive gear being affixed to said shaft for rotation therewith and being meshed with one of the gear elements of said planetary gears, said input and output gear members having external gear teeth extending about the entire outside circumference thereof for operative engagement with said connecting means of said supplemental range mechanism and with said primary summing mechanism, respectively, and being rotatable on said shaft, said output gear member also having internal gear teeth extending entirely about an inside circumferential portion thereof and meshed with second gear elements of each of said planetary gears, whereby said secondary summing mechanism will combine rotary inputs from said shaft and said supplemental range mechanism to generate a cumulative rotary output to said primary summing mechanisms.

22. A range arm assembly incorporating a speed-reduction mechanism, and suitable for use in a fuel pump computer variator, including a shaft, an input pinion affixed on said shaft, a radially offset, axially extending bale member pivotably mounted upon said shaft, a radially extending range arm slidably engaged with said bale member for conjoint pivotal movement, said range arm having a selector gear on its outer end and a drive gear in meshing engagement with said selector gear, said drive gear being keyed to said shaft to effect rotation thereof and for axial shifting with said range arm, an output gear rotatably mounted on said shaft adjacent said input pinion, and a compound gear rotatably mounted on said bale member, said compound gear having first and second gear elements in meshing engagement with said pinion and said output gear, respectively, said output gear, pinion and gear elements being of such relative sizes as to cause said output gear to rotate at a slower speed than said input pinion when driven thereby through said compound gear.

* * * * *